April 15, 1924.
L. MARX
MECHANICAL EDUCATIONAL TOY
1,490,285
Filed Sept. 29, 1923
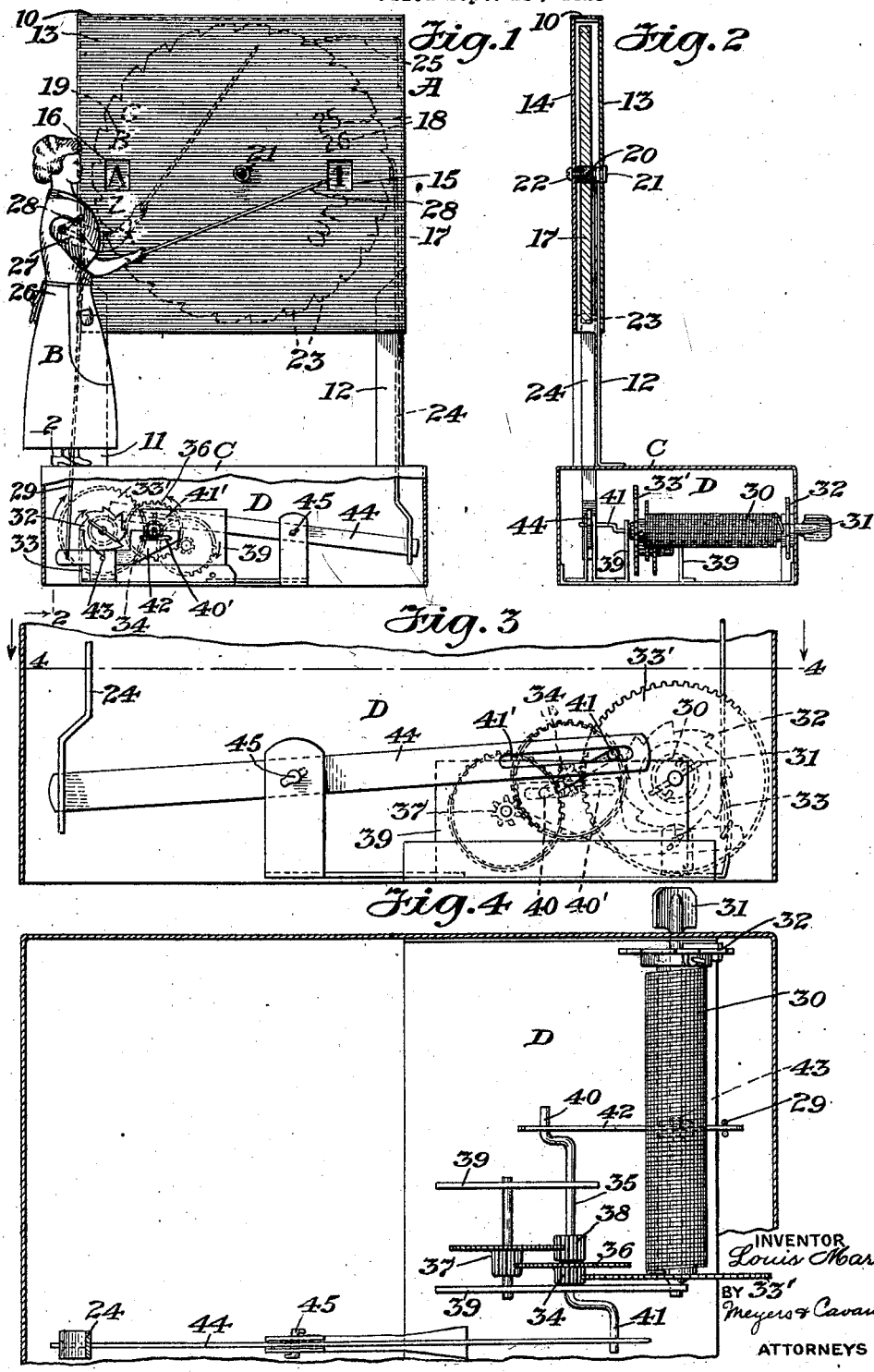
INVENTOR
Louis Marx
BY
Meyers & Cavanagh
ATTORNEYS Patented Apr. 15, 1924.

1,490,285

UNITED STATES PATENT OFFICE.

LOUIS MARX, OF NEW YORK, N. Y.

MECHANICAL EDUCATIONAL TOY.

Application filed September 29, 1923. Serial No. 665,573.

*To all whom it may concern:*

Be it known that I, LOUIS MARX, a citizen of the United States, and resident of New York city, in the county of New York and State of New York, have invented certain new and useful Improvements in Mechanical Educational Toys, of which the following is a specification.

This invention relates to a toy, and more particularly to a mechanical educational toy; and has special reference to the provision of a toy designed to supply amusement with instruction, and constructed to simulate and operate in semblance of an attractive school room scene.

The principal objects of my present invention include the provision of a mechanically operated educational toy in which a changeable exhibitor which may be set and mechanically operated by a child is constructed in the form of an educational device for supplying instruction through the channels of play and amusement; the more specific provision of an educational toy of this character which is constructed to simulate a common school room scene having an incentive-creating attraction for the young, and which is operable in semblance of a school room method of imparting knowledge; and the further provision of a mechanical educational toy constructed to permit an interchangeability of exhibitors for changing the subject for instruction; and the still further provision of a mechanical toy having few and efficiently coordinated parts providing a serviceable and inexpensive construction.

To the accomplishment of the foregoing and such other objects as may hereinafter appear, my invention consists in the elements and their relation one to the other as hereinafter particularly described and sought to be defined in the claims; reference being had to the accompanying drawings forming a part thereof, wherein:

Fig. 1 is a front elevational view of the invention with parts broken away to show the operating mechanism thereof, Fig. 2 is a cross-sectional elevational view with parts shown in cross-section on the line 2—2, Fig. 1, and with other parts broken away for purposes of clarity of illustration.

Fig. 3 is an enlarged fragmentary view of the operating mechanism showing the same in a stage of operation different from that depicted in Fig. 1, and Fig. 4 is an enlarged view taken in cross-section on the line 4—4, Fig. 3.

Referring now more in detail to the drawings, the toy of my present invention comprises generally a changeable exhibiting device A simulating a school blackboard, a figure B simulating a teacher, the changeable exhibiting device A and the figure B being both mounted on and supported by a platform C which houses a mechanism D adapted to be set in operation for imparting movement to the figure B in coordination with the producing of a changeable exhibition of the exhibiting device A in natural simulation and semblance of a school room method of instruction.

The changeable exhibiting device A in the preferred construction includes a device 10 supported on the spaced standards 11 and 12, the said device 10 having a front wall 13 made in simulation of a blackboard and a removable rear wall 14, the front wall 13 being provided with one or more exhibiting or display windows such as 15 and 16 through which may be changeably displayed any desired characters, indicia or representations for affording instruction.

Forming part of the changeable exhibiting device A and housed by the blackboard device 10 I provide a movable exhibitor which in the preferred construction may take the form of a rotary disk 17 provided with characters or indicia which may be changeably displayed at the display windows 15 and 16 upon rotation of the disk, the said indicia or characters relating to any desired subject for instruction, such as for example the alphabetical or numerical system, the construction exemplified in the drawings including the provision of a circumferential row of numerals 18 arranged to be displayed at the window 15 and a circumferential and concentric row of letters 19 arranged to be exhibited at the window 16, the windows and the circumferential rows of characters being arranged at different radii from the axis of rotation of the disk.

The rotary exhibiting disk 17 is preferably journalled for rotation on the blackboard device 10 so as to permit removability and interchangeability of exhibitor disks, a number of which may be supplied with the toy to permit a change of subject-matter for instruction; and to this end the disk 17 is rotatably mounted upon a stud 20 secured to the front wall 13 of the blackboard by way of the securing means 21, the rear wall 14 of the blackboard device being removably attachable to the stud 20 by means of the securing element 22, the construction being such that the rotary disk is firmly supported for rotation by both the front and rear walls 13 and 14 and is removable for permitting the desired change by removing the rear wall 14.

For producing the changeable display, the rotary disk 17 is adapted to be preferably intermittently rotated, and to this end I prefer to serrate the circumference of the said disk to produce a plurality of teeth 23 with which cooperates a reciprocable operating rod 24 arranged to be movable through so as to be concealed by the standard 12, the said operating rod being reciprocable so as to successively engage the teeth 23 of the disk to impart an intermittent rotation to the disk in one direction, return movement being prevented by the spring stop or holding pawl 25.

The Figure B is made mechanically movable so as to produce a life-like and natural simulation of a school teacher, a preferred construction including the provision of a figure having a stationary body 26 and a movable arm 27 carrying an indicating means or pointer 28, the said arm and pointer being oscillatable as between the full and dotted line positions shown in Fig. 1 of the drawings by means of a crank arm 28 connected to the arm 27, the said crank arm being oscillatable by means of a reciprocable rod 29 which is preferably arranged interiorly of so as to be concealed by the body 26 of said figure.

The changeable exhibitor disk 17 and the indicating means or pointer 28 are synchronously operated and preferably in a manner so that the indicating means swings from the dotted line to the full line indicating position during movement of the changeable exhibiting disk and so that the pointer indicates a character 18 at the display window 15 during a dwell period of the exhibiting disk, and to this end the operating rod 24 and the rod 29 are coordinately operated by the mechanism D heretofore mentioned This mechanism D may conveniently comprise a spring motor 30 provided with a winding key 31, one terminal of the spring motor being attached to a winding ratchet 32 with which cooperates the spring holding pawl 33, the other end of the spring being connected to an operating gear 33′ which meshes with a pinion 34 which may be loosely mounted on a shaft 35, the said pinion being provided with a gear 36 arranged to drive a gear pinion 37 for driving a pinion 38 fixed to the operating shaft 35, suitable brackets 39, 39 being provided for supporting and journalling the gearing system.

The shaft 35 may conveniently be provided with the oppositely arranged integral crank arm portions 40 and 41, the crank arm 40 being provided for oscillating a lever 42 fulcrumed as at 43, the rod 29 being connected to one end of said lever; and the crank arm 41 is provided for oscillating a second lever 44 journalled as at 45 to which the operating rod 24 is connected, the said levers 42 and 44 being provided with slots 40′ and 41′ (see particularly Figs. 1 and 3) through which extend respectively the crank arms 40 and 41.

The operation of the educational toy will be fully apparent from the above detailed description thereof. It will be apparent that upon winding the motor 30 the operating shaft 35 will be rotated to oscillate the levers 42 and 44 for imparting the reciprocal motion to the rods 24 and 29 for intermittently moving the rotary educational disk 17 and for moving the indicating arm 28 synchronously therewith, the parts being proportioned and relatively arranged to effect the desired coordinated action between the indicating means 28, the rotary disk 17 and the display window 15 to simulate in a life-like manner the school room method of imparting instruction.

While I have shown my device in the preferred form, it will be obvious that many changes and modifications may be made in the structure disclosed without departing from the spirit of the invention, defined in the following claims.

I claim:

1. A mechanical educational toy comprising a platform, a movable changeable exhibiting device simulating a blackboard mounted on said platform, a figure also mounted on said platform and spaced from said exhibiting device, the said figure being provided with a movable indicating means or pointer, and mechanism for coordinately operating the exhibiting device and pointer in semblance of a school room method of imparting instruction.

2. A mechanical educational toy comprising a platform, a movable changeable exhibiting device simulating a blackboard supported on said platform, a figure simulating a teacher supported on said platform and spaced from said exhibiting device, the said figure being provided with a movable indicating means or pointer, and mechanism housed by said platform for coordinately operating the exhibitor and the pointer in semblance of a school room method of imparting instruction.

3. A mechanical educational toy comprising a platform, a device simulating a blackboard supported on said platform, the said device having an exhibiting or display window, a disk rotatably supported on said device and provided with a plurality of characters which are changeably positioned at said exhibiting window when the disk is rotated, a figure on said platform provided with an indicating means movable to and from said exhibiting window, and mechanism housed by said platform for synchronously imparting movement to the said disk and said indicating means.

4. A mechanical educational toy comprising a platform, a device simulating a blackboard supported on said platform, an intermittently movable changeable exhibitor associated with said device, a figure supported on said platform and provided with a movable indicating means or pointer, and mechanism housed by said platform for synchronously imparting movement to said changeable exhibitor and said indicating means in a manner such that the indicating means points to a given character on said exhibitor during a dwell period in the intermittent motion thereof.

5. A mechanical educational toy comprising a platform, a device simulating a blackboard supported on standards on said platform, the said device having an exhibiting or display window, a rotary disk supported for rotation on said device and provided with a plurality of indicia arranged for changeable display behind the said window upon rotation of the same, a figure supported on said platform and provided with a movable arm carrying an indicating means or pointer movable to and from the said display window, and mechanism housed by said platform for imparting an intermittent motion to said rotary disk and an oscillating motion to said arm and pointer.

6. The combination of a mechanical educational toy as recited in claim 9, in which the said mechanism includes a reciprocable rod connected to said movable arm interiorly of said figure and concealed by said figure, an operating rod for said disk movable adjacent to and concealed by one of the standards supporting the blackboard device, and a spring operated motor mechanism for operating the said rods.

Signed at New York city, in the county of New York and State of New York this 22nd day of September A. D. 1923.

LOUIS MARX.